US012070141B2

(12) United States Patent
Felder et al.

(10) Patent No.: US 12,070,141 B2
(45) Date of Patent: *Aug. 27, 2024

(54) WATERPROOF LID WITH BLUETOOTH SPEAKER INTEGRATION

(71) Applicant: FW INNOVATIONS, LLC, Fort Worth, TX (US)

(72) Inventors: Craig A. Felder, Fort Worth, TX (US); Bruce Wright, Fort Worth, TX (US)

(73) Assignee: FW INNOVATIONS, LLC, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,598

(22) Filed: Mar. 27, 2023

(65) Prior Publication Data

US 2023/0309724 A1 Oct. 5, 2023

Related U.S. Application Data

(63) Continuation of application No. 17/215,649, filed on Mar. 29, 2021, now Pat. No. 11,612,258, which is a (Continued)

(51) Int. Cl.
*A47G 19/22* (2006.01)
*B65D 51/16* (2006.01)
(Continued)

(52) U.S. Cl.
CPC ......... *A47G 19/2227* (2013.01); *B65D 51/16* (2013.01); *B65D 51/245* (2013.01); (Continued)

(58) Field of Classification Search
CPC ........ A47G 19/2227; A47G 2019/2238; A47G 2019/2244; A47G 19/2272; A47G 2019/225; A47G 2200/08; A47G 23/16; A47G 2200/18; A47G 23/0216; A47G 23/0225; A47G 2200/205; A47G 21/182; A47G 2200/183; A47G 19/12; A47G 19/2205; A47G 2023/0291; A47G 2200/166; A47G 19/2288; A47G 19/2255; A47G 2200/066
(Continued)

(56) References Cited

U.S. PATENT DOCUMENTS 7,681,501 B1 3/2010 Wishert
7,950,541 B2 5/2011 Holcomb et al.
(Continued)

*Primary Examiner* — Ajibola A Akinyemi
(74) *Attorney, Agent, or Firm* — Fish & Richardson P.C.

(57) ABSTRACT

A beverage container lid can include an audio speaker; a wireless transceiver to transmit and receive wireless signals; and a hardware processor to process wireless signals received by the wireless transceiver and to output audible signals through the audio speaker. The beverage container lid can also include a water-tight housing, the wireless transceiver and hardware processor contained within the water-tight housing; a drinking aperture; and a fluid channel, the fluid channel to allow fluid to pass through the drinking aperture, and the water-tight housing to prevent fluid passing through the fluid channel from contacting the wireless transceiver and hardware processor.

20 Claims, 5 Drawing Sheets

Related U.S. Application Data continuation of application No. 16/362,629, filed on Mar. 23, 2019, now Pat. No. 10,959,551.

(60) Provisional application No. 62/711,230, filed on Jul. 27, 2018.

(51) Int. Cl.
*B65D 51/24* (2006.01)
*B65D 53/02* (2006.01)
*H04R 1/02* (2006.01)

(52) U.S. Cl.
CPC ........... *B65D 51/248* (2013.01); *B65D 53/02* (2013.01); *H04R 1/028* (2013.01); *A47G 2019/2238* (2013.01); *A47G 2019/2244* (2013.01); *B65D 2203/04* (2013.01); *B65D 2203/12* (2013.01); *B65D 2543/00046* (2013.01); *H04R 2420/07* (2013.01)

(58) Field of Classification Search
USPC .......................................................... 220/212
See application file for complete search history.

(56) References Cited

U.S. PATENT DOCUMENTS

| | | | | |
|---|---|---|---|---|
| D700,014 | S | 2/2014 | Zeanah | |
| 10,213,032 | B1 * | 2/2019 | Fontaine-Cole ... | B65D 25/2811 |
| 10,675,216 | B2 * | 6/2020 | Mejia ........................ | A61J 7/04 |
| 2005/0035018 | A1 * | 2/2005 | McRobbie ......... | B65D 43/0212<br>206/459.5 |
| 2014/0303790 | A1 | 10/2014 | Huang et al. | |
| 2015/0360834 | A1 * | 12/2015 | Mikhail ............... | B65D 51/248<br>340/384.5 |
| 2016/0286993 | A1 | 10/2016 | Pau | |
| 2018/0360244 | A1 | 12/2018 | Kelaher et al. | |

* cited by examiner

WATERPROOF LID WITH BLUETOOTH SPEAKER INTEGRATION

CROSS REFERENCE TO RELATED APPLICATIONS

Pursuant to 35 U.S.C. § 120, this application is a continuation of and claims the benefit of priority to U.S. patent application Ser. No. 17/215,649, filed on Mar. 29, 2021, now issued as U.S. Pat. No. 11,612,258 on Mar. 28, 2023, which is a continuation of U.S. patent application Ser. No. 16/362,629, filed Mar. 23, 2019, now issued as U.S. Pat. No. 10,959,551 on Mar. 30, 2021, which claims the benefit pursuant to 35 U.S.C. § 119(e) of U.S. Provisional Patent Application having Ser. No. 62/711,230 filed on Jul. 27, 2018, the contents of which are hereby incorporated by reference herein in their entirety.

BACKGROUND

Insulation cups, or double wall beverage containers, are containers that house an inner and an outer wall in order to maintain temperatures of beverages. The inner wall can employ stainless steel while the outer wall can be stainless steel, plastic, or other kinds of proprietary materials, including different types of ceramic or glass.

SUMMARY

Aspects of the embodiments include a beverage container lid that includes an audio speaker; a wireless transceiver to transmit and receive wireless signals; and a hardware processor to process wireless signals received by the wireless transceiver and to output audible signals through the audio speaker.

Some embodiments also include a water-tight housing, the wireless transceiver and hardware processor contained within the water-tight housing; a drinking aperture; and a fluid channel, the fluid channel to allow fluid to pass through the drinking aperture, and the water-tight housing to prevent fluid passing through the fluid channel from contacting the wireless transceiver and hardware processor a drinking aperture cover configured to slide over the drinking aperture. The beverage container lid can include a magnetic element to prevent the drinking aperture cover to move.

In some embodiments, the wireless transceiver comprises a Bluetooth transceiver. The Bluetooth transceiver to link with an audio device and receive wireless signals from the audio device, the wireless signals carrying encoded signals representative of audio signals from the audio device.

In some embodiments, the wireless transceiver is to link with one or more other beverage container lids and to synchronize audio output with the one or more other beverage container lids.

Some embodiments can include a microphone. The microphone to receive audible commands. The hardware processor to interpret the received audible commands and convert the received audible commands to electronic command signals and to execute the electronic command signals. In some embodiments, the processor is to convert electrical signals into audible voice signals and to cause the speaker to output the audible voice signals.

In some embodiments, the wireless transceiver to receive a wireless signal representative of a command input into the audio device; and the hardware processor to convert the wireless signal into a command and execute the command.

In some embodiments, the beverage container includes bisphenol A (BPA)-free plastic.

Some embodiments include a base section. The base section can include one or more of a screw-on base, a hinged base, a friction fit base; or the beverage container lid can be an integrated lid. The an O-ring can surround an outer diameter of the friction fit base or the hinged base.

Some embodiments can include a light emitting diode to signal a notification. The notification can be a battery power indication, a power on/off indication, a Bluetooth connectivity indication, etc.

Some embodiments can include a screen to display one or both of text or images.

Some embodiments can include a drinking aperture and sensor proximate the drinking aperture to track an amount of fluid that passes through the drinking aperture.

Some embodiments can include a loop rigidly affixed to the beverage container lid.

Some embodiments can include an input port, the input port to receive one or more of power, software updates, firmware updates, or data. Some embodiments can include an output port. The ports can be compliant with USB, Thunderbolt, or other communications and/or power protocols.

Figure 1:
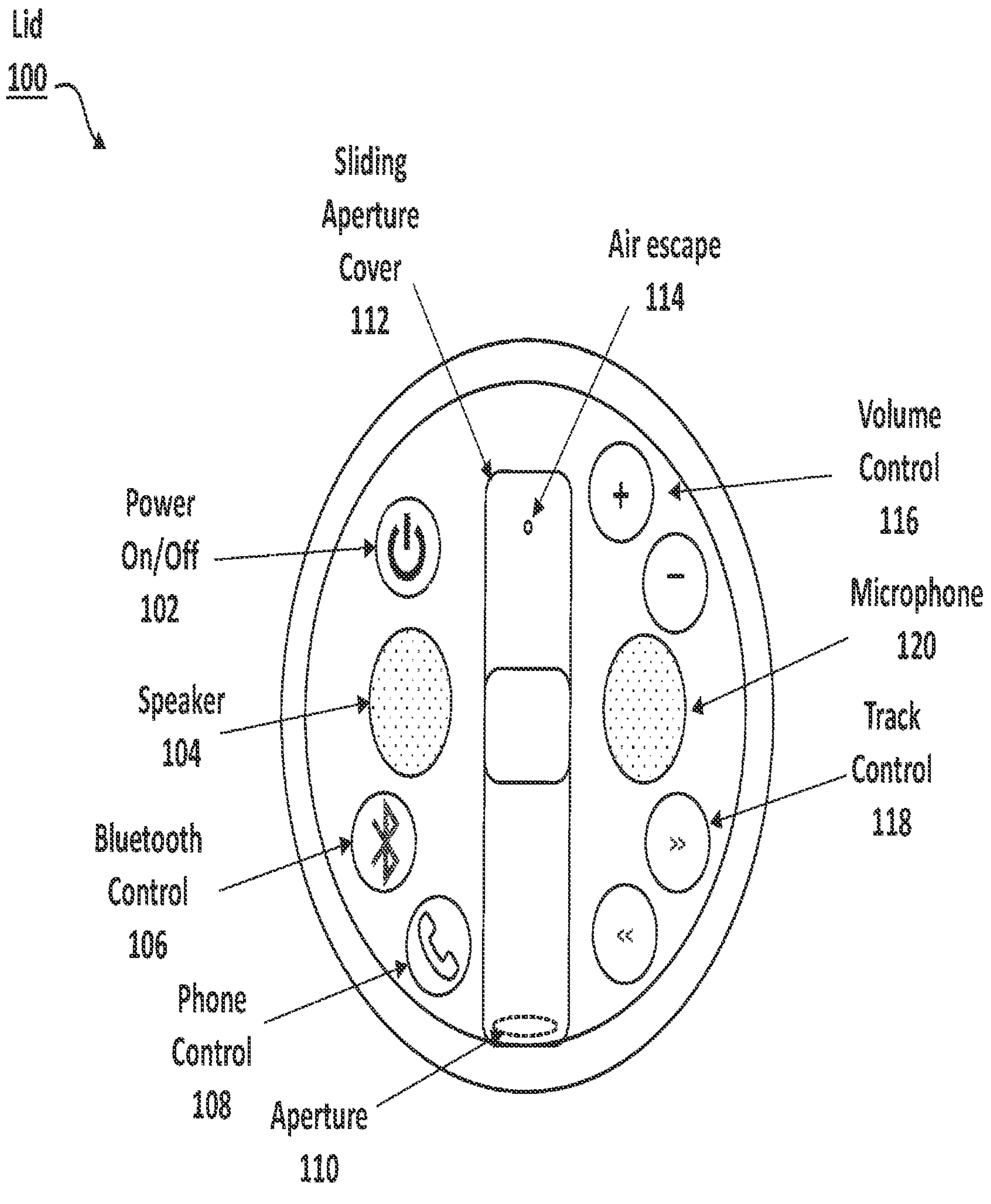
FIG. 1 is a schematic diagram of a top view of an example beverage container lid that includes a Bluetooth-based audio system in accordance with embodiments of the present disclosure.

Figures are not drawn to scale.

DETAILED DESCRIPTION

BLUETOOTH™ technology can pair an audio source with one or more audio output devices. With the miniaturization of electronic components, audio output devices can have small form factors, and form factors that conform to various shapes. One such shape can be a lid for a beverage container. Example beverage containers include double insulated beverage containers, such as those made by YETI™, RTIC™, BEAST™, TER VIS™, CONTIGO™, ORCA™, PELICAN™, ENGEL™, etc. This disclosure describes a lid for a beverage container that includes an integrated Bluetooth speaker.

Aspects of the embodiments can include a universal, multifunctional lid. The lid can fit with a beverage container. The lid can be made from a waterproof material, and house various electronic components, including, but not limited to a Bluetooth receiver for receiving Bluetooth signals, an audio speaker for audibly outputting sound, such as music and making/answering phone calls when paired with a wireless communications device, power sources, control circuitry, a processor, memory, and can house other electronics to facilitate charging capabilities, Bluetooth and/or network connectivity, volume adjustment, and other electrical aspects of the system.

The lid can house a speaker, a Bluetooth receiver, a power source, control logic circuitry, audio logic circuitry, as well as other electronic components. The speaker/electronic component will be housed in a top portion of the lid that is isolated from a liquid flow area, thereby preventing fluid from leaking into the electronics compartment of the lid. The lid also includes an aperture for drinking. The aperture can be accessed by a slider that can be slide open to expose the aperture, and in some embodiments, to expose an air escape hole, allowing fluid to flow through the aperture smoothly.

The power source can be an integrated lithium (Li)-ion rechargeable battery via a standard input, such as a mini USB port/connection, thunderbolt, etc. The lid can include one or more inputs, including a power input. The power input can double as a control input/output for updating software or firmware that controls the electronic portions of the lid. The lid can include more than one input for various purposes. The lid can include a 3.5 mm auxiliary for non-wireless connections.

The lid includes a Bluetooth receiver, that allows the lid to receive Bluetooth signals from an audio device and output audio signals (e.g., through audio output logic circuitry) to an audio output, such as a speaker. An example Bluetooth system can use Bluetooth 4.1 technology or later to connect to a wireless source. The Bluetooth system includes a capability to synchronize with other output devices, e.g., other Bluetooth lids.

The lid can include control surfaces on the outside, to allow a user to control various functions of the lid. For example, the control surfaces can include: Bluetooth synchronization button, volume up, volume down, next track, previous track, call answer/end, power on/off.

Further details of various embodiments are described below:

FIG. 1 is a schematic diagram of a top view of an example beverage container lid 100 that includes a Bluetooth-based audio system in accordance with embodiments of the present disclosure. The top view of the lid 100 can include controls for controlling various functions for the speaker(s) 104. The controls can include a power button 102, volume control buttons 116, track controls 118, etc. Certain buttons can have double functions. For example, pressing a track forward button once can advance a track, holding down the track forward button can fast forward through a track; pressing a volume up button can increase the volume, and holding down the volume up button can toggle between play and pause of a track. The controls can also include Bluetooth function buttons, such as a Bluetooth control 106 (e.g., for synchronizing the speaker 104 to an audio source, such as a cellular phone or music device), phone control 108, etc. The lid 100 can also include a microphone 120 for receiving voice commands.

The lid 100 can also include an aperture 110 for allowing fluids to pass from the beverage container through the lid 100. The aperture 110 can be covered by the sliding aperture cover 112. The sliding aperture cover 112 can slide to cover the aperture 110 and to cover an air escape hole 114. When open, the sliding aperture cover 112 can expose both the aperture 110 and the air escape hole 114. The sliding aperture cover 112 can include magnetic elements or other mechanisms to hold the sliding aperture cover 112 in place when open or closed.

The lid 100 can include a speaker 104. Speaker 104 can be an audio device that can process electrical signals to emit audio signals. The speaker volume can be controlled by volume buttons 116 on the lid 100 or by the audio source itself. The speaker 104 can also emit voice or speech signals for voice phone calls. Coupled with microphone 120, the lid 100 can act as a telephonic transceiver for communicating through the audio source across a wireless (e.g., Bluetooth) connection. The speaker 104 can include a water-tight backing to prevent water from entering into the speaker electronics or into the lid housing (e.g., housing 232 shown in FIG. 2 or housing 318 shown in FIG. 3).

Figure 2A:
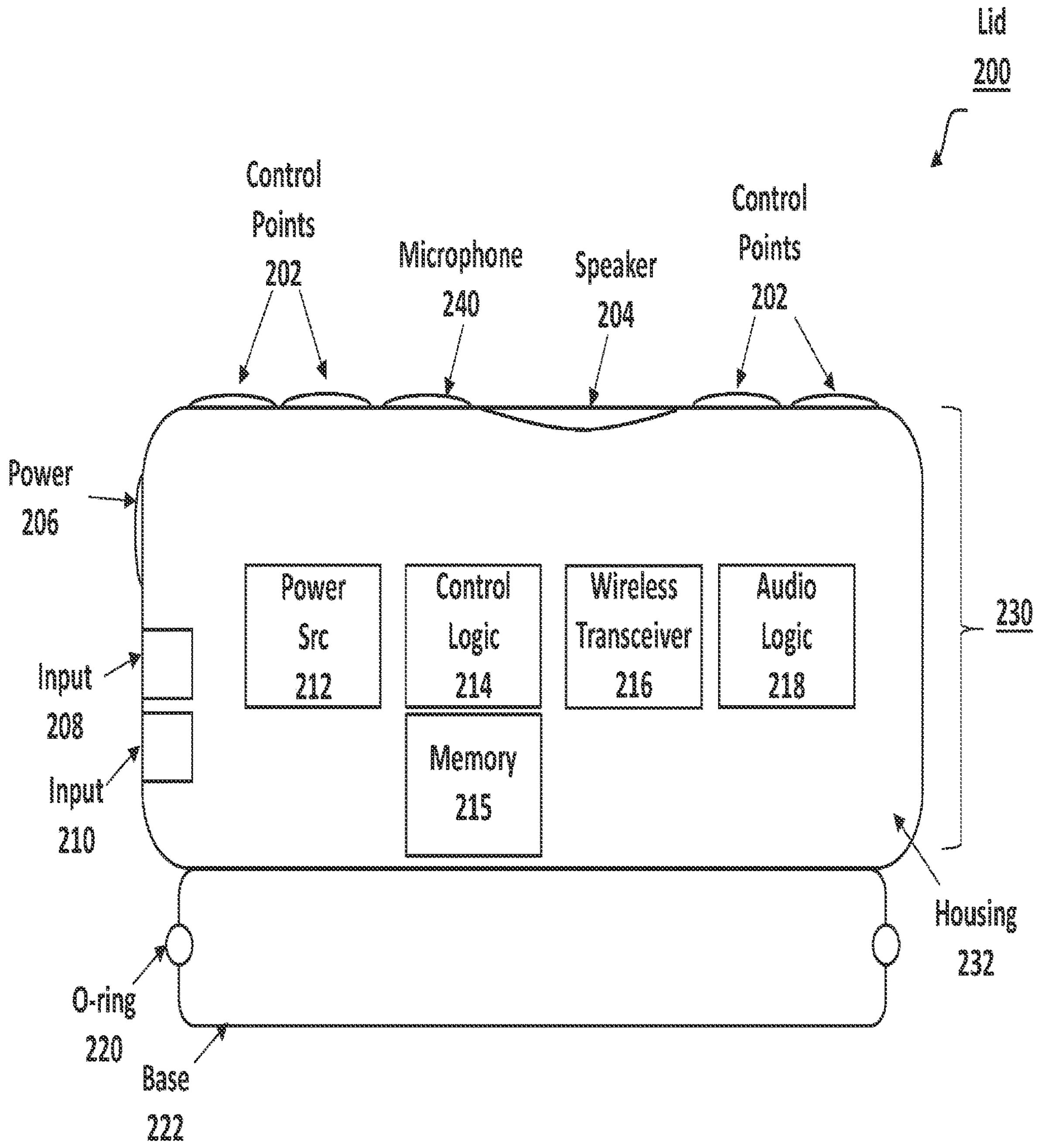
FIG. 2A is a schematic diagram of a side cross-sectional view of an example beverage container lid in accordance with embodiments of the present disclosure.

FIG. 2A is a schematic diagram of a side cross-sectional view of an example beverage container lid 200 in accordance with embodiments of the present disclosure. The lid 200 can be similar to lid 100. Lid 200 is shown to have a top section 230 and a base 222. The diagram of FIG. 2A illustrates example electronic components that can reside within the top section 230 of the lid 200. The electronic components reside within the top section 230 and are isolated and protected from the fluid channel. Example electrical components include a power source 212, control logic 214, wireless transceiver 216, and audio logic 218.

The power source 212 can include a battery, such as a lithium-ion rechargeable battery or other type of battery or rechargeable power source. The power source 212 can be coupled to an input port, such as input 208 or 210. One or both of input 208 or input 210 can be a port based on input protocols, such as USB, MicroUSB, Thunderbolt, etc. that can be used for power transfer and/or data transfer between the lid 200 and another device, such as a computer or mobile device. One or both of input 208 or input 210 can also be a dedicated power port.

Control logic 214 can include hardware circuitry and/or software or firmware for controlling various operations of the speaker system. The lid 200 can, in embodiments, also include audio logic 218. Audio logic 218 can include hardware circuitry and/or software or firmware for performing certain audio functions. In some embodiments, control logic 214 and audio logic 218 are implemented as a single unit; in other embodiments, different units can be used to provide control and audio functionality.

Control logic 214 can include a central processing unit, processor cores, application-specific integrated circuit (ASIC), or other hardware circuitry used for controlling various functions and operations of the speaker system. For example, control logic 214 (in embodiments, using audio logic 218) can provide audio compression or decompression capabilities, audio encoding and decoding, volume control, playback control, Bluetooth functions, such as controlling connections and managing paired or known devices, telephony functions, and power management, among other functions. The lid 200 can make use of a memory 215. Memory 215 can include a cache memory, flash memory, solid state memory, memory card, or other type of memory. Memory 215 can be used to cache data, store information, or for other memory or storage processes.

The control logic 214 can receive inputs from one or more control points 202, from power button 206, from external devices through input 208 or 210, or through wireless transceiver 216 by audible commands (speech recognition) or through commands received from a wireless connected device, such as a smart phone.

The lid 200 can include a wireless transceiver 216. Wireless receiver 216 can include a Bluetooth transceiver, Wi-Fi transceiver, cellular radio, and/or other type of wireless communications interface. Wireless transceiver 216 can be used to receive wireless signals carrying audio information from an audio source (such as a smart phone or wireless music device) to the lid 200 for audio playback through speaker 204.

For example, the lid 200 can include a microphone 240 for receiving audible commands. Lid 200 can also include a speech recognition AI that can recognize voice commands, such as Siri, Google, Echo, Alexa, etc. The lid 200 can be controlled by an external speech recognition device, such as Alexa or Echo type device.

In embodiments, the lid 200 can receive commands through the wireless transceiver from a wireless communications device. For example, a smart phone can include a dedicated application that can be used to control the lid 200 functions. The smart phone can include a music playback application, such as a music list, Pandora, Spotify, etc., that can be used to select tracks, advance tracks, adjust volume, play songs or playlists, etc. A user can use a music playback application to control playback, and the smart phone can send commands wirelessly to the lid 200 to control playback through speaker 204. For example, pressing play from an application on a smart phone can cause the smart phone to send music signal wirelessly to the lid 200 and for music to be played from the speaker 204.

The lid 200 can also include a base section 222. Base section 22 can be used to fit the lid 200 onto a beverage container, such as a double insulated tumbler. The base section 222 can include an O-ring 220 that can help to form a seal between the lid 200 and the beverage container.

The base 222 can have a size that fits a beverage container, such as a 20 ounce container or a 30 ounce container or other sized container. As an example, a lid that fits a 20 ounce container lid can have an outer diameter in the range from 8-9 cm and an inner diameter in the range from 7-8 cm. A 30 ounce container lid can have an outer diameter in the range from 8.5-10.5 cm and an inner diameter in the range from 7.5 cm to 9.5 cm.

The inner diameter of the base 222 represents a diameter of the inside of the container such that the lid 200 would form a sealed fit when pressed into the container opening. The outer diameter represents the outer diameter of a beverage container, such that the lid allows a user to drink from the beverage container comfortably. The lid can include a rubber O-ring seal 220 that is to form a friction based connection to the inner wall of a beverage container.

The lid can be made from a waterproof material. For example, the lid can be constructed of a bisphenol A (BPA)-free plastic or rubberized material.

Figure 2B:
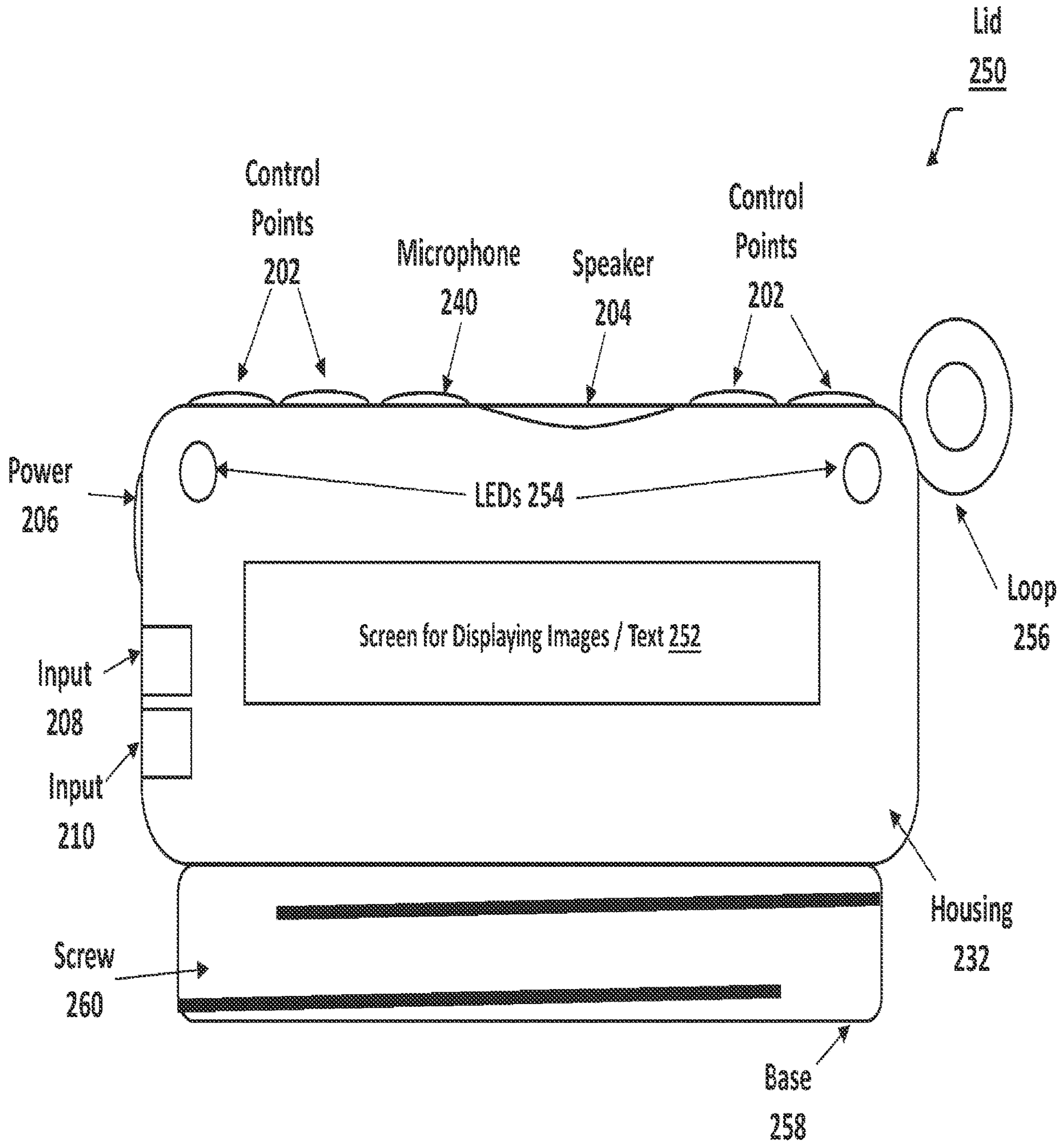
FIG. 2B is a schematic diagram of a side view of an example beverage container lid showing a screen for viewing text and/or images in accordance with embodiments of the present disclosure.

FIG. 2B is a schematic diagram of a side view of an example beverage container lid 250 showing a screen for viewing text and/or images in accordance with embodiments of the present disclosure. The beverage container lid 250 can be similar to that shown in FIGS. 1 and 2A. The beverage container lid 250 can include a screen 252 that can display text and/or images. The screen 252 can be a waterproof (or water resistant) screen similar to a smart watch screen or smart phone screen. The beverage container lid 250 can include control logic 214 that can process information received from a Bluetooth connected device or from a Wi-Fi connection to display information on the screen 252. For example, the screen can display music information (e.g., band names, album names, song titles, etc.), notifications of incoming messages, the messages themselves, contact information, calendar alerts, weather alerts, fitness alerts (such as quantity of liquid that has passed through the aperture), etc. In embodiments, the screen can also display images or video, such as MMS images, doppler radar imagery, etc. Other types of text and images are also contemplated.

The beverage container lid 250 can include one or more light emitting diodes (LEDs) 254. LEDs 254 can indicate power level, power on/off, Bluetooth searching for pairing a device or devices, Bluetooth connectivity, incoming calls or text messages, low power indicators, etc. The LED can also serve as a flashlight to provide lighting for a user. The LEDs 254 can emit various colors, emit light at various brightness, and can flash, etc. depending on the application.

The beverage container lid 250 can include a loop 256. Loop 256 can be integrated into the beverage container lid 250 or rigidly affixed to the beverage container lid 250. The loop 256 can be used to hang the lid 250 for transport, drying, or as a speaker, etc. The loop 256 can be coupled to a d-ring or carabiner or other device.

The beverage container lid 250 is shown to include a screw-on base 258. Screw-on base include screws 260 that can screw onto the top of a beverage container so that liquid does not leak from the interface between the lid 250 and the beverage container.

Figure 3:
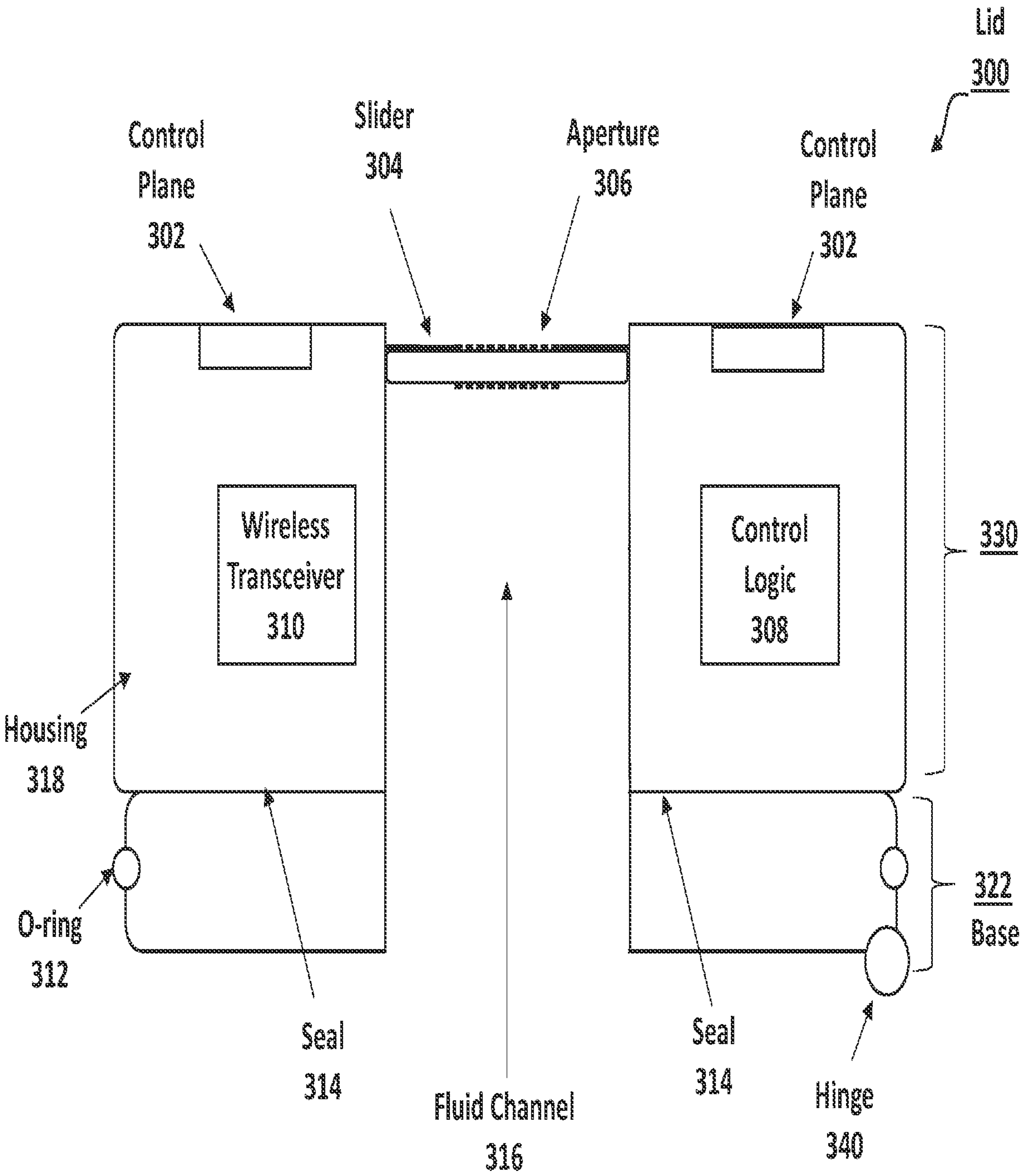
FIG. 3 is a schematic diagram of another side cross-sectional view of the example beverage container lid in accordance with embodiments of the present disclosure.

FIG. 3 is a schematic diagram of another side cross-sectional view of the example beverage container lid 300 in accordance with embodiments of the present disclosure. The lid 200 can include a drinking aperture. Lid 300 can be similar to lids 100 and 200 described above. The lid 300 can include a control plane 302 that includes one or more control points (buttons or other interface) for controlling various functions of the speaker system. The lid also includes a slider 304 that can cover or expose a drinking aperture 306. The drinking aperture 306 can have a water-resistant seal that is covered by a sliding or hinge-based mechanism (e.g., slider 304). The lid 200 can include a wider space to allow for comfortable drinking and fit/seal to lips/mouth. Above and/or behind the drinking aperture 306 is a recessed channel in the middle of the speaker that will be where the water-resistant cover is and will allow for a comfortable use without interference with users nose.

The lid 300 can include a fluid channel 316. Fluid channel 316 can allow fluid to pass from a beverage container through the drinking aperture 306. The lid 300 can include a housing 318 in a top section 330 that houses the electronics, such as the wireless transceiver 310 and/or control logic 308. The housing 318 can be water tight so that fluid passing through the fluid channel 316 and through the drinking aperture 306 does not enter the housing 318 to affect the electronic components. In embodiments, a seal 314 is created between the top section 330 and the base 322; in other embodiments, the top section 330 and the base 322 are a single molded piece. An O-Ring 312 can be used to seal the lid 300 onto a beverage container to prevent fluid from spilling. The lid 300 is shown to include a hinge-type of connection to a beverage container. The high-type connection can use a swing or pivot hinge 340 to open and close the lid 300 to pour liquid into the container.

Figure 4:
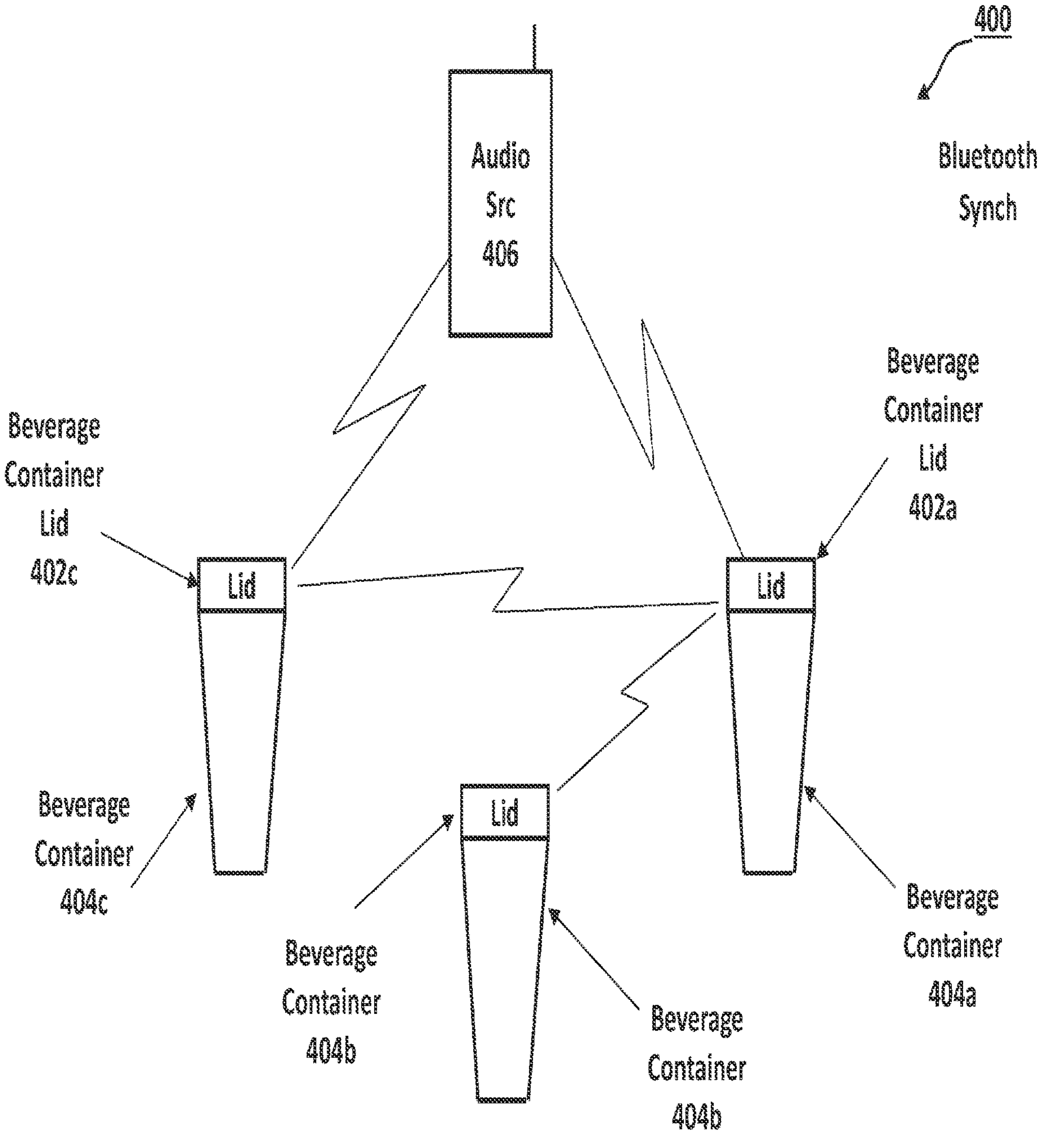
FIG. 4 is a schematic diagram illustrating an audio device synchronizing to one or more beverage container lids in accordance with embodiments of the present disclosure.

FIG. 4 is a schematic diagram 400 illustrating an audio device synchronizing to one or more beverage container lids in accordance with embodiments of the present disclosure. An audio source 406 can link with one or more lids 402*a-c* using a wireless communications protocol, such as Bluetooth. The audio source 404 can pair with one or more lids 402*a-c*. Each lid 402*a-c* can include a Bluetooth transceiver (or other wireless protocol transceiver) for receiving and transmitting information wirelessly using a Bluetooth protocol (or other wireless protocol). Each lid 402*a-c* can emit the same audio sound synchronously. In embodiments, the audio source 406 can include an application that can facilitate Bluetooth synchronization with multiple Bluetooth receivers. In embodiments, an audio source 406 can be paired with a single Bluetooth receiver in a first lid 402*a*, and that lid 402*a* can synchronize with a second and/or third lid 402*b-c*. The same audio may be played at the same timing between all of the lids 402*a-c*.

Beverage container lids 402*a-c* can be similar to one or more of lids 100, 200, 250, or 300. In embodiments, the one or more lids 402*a-c* can be integrated lids that are integrated onto the beverage containers 404*a-c*, respectively.

The lids 100, 200, 250, 300, and 402*a-c* are shown in separate figures with different features. It is understood to those of skill in the art that the beverage container lids can include any combination of features from each of the embodiments illustrated in the figures.

In a first example, a lid can include a fluid-tight housing that houses a speaker that is connected to an audio output circuit, the audio output circuit coupled to a Bluetooth receiver.

In a second example, the lid can receive audio signals from an audio source across a Bluetooth connection by a Bluetooth receiver housed within the lid, the lid can output audio signals through a speaker that is housed within the lid.

In a third example, the lid includes a fluid channel through which a fluid can pass from a beverage container through an aperture on the lid. The fluid channel is separated from the internal chamber of the housing by a fluid-tight seal.

In a fourth example, the housing of the lid is made from a BPA-free material, water-resistant material, rubberized material, or other material that can isolate the internal electronics from water or other fluids.

In a fifth example, the lid is compatible with a 20 or 30 oz beverage container, such as a plastic or stainless steel tumbler or rumbler. The beverage container can be a double-insulated beverage container.

In a sixth example, the lid includes a lower section that includes an O-ring to friction seal the lid onto a beverage container.

In a seventh example, the lid includes a slider that can slide open to uncover an aperture, the aperture allowing a fluid to pass through the fluid channel.

What is claimed is:

1. An apparatus comprising:

a beverage container lid comprising:

an audio speaker;

a wireless transceiver to transmit and receive wireless signals;

a hardware processor to process wireless signals received by the wireless transceiver and to output audible signals through the audio speaker; and a housing;

wherein the audio speaker, the wireless transceiver, and the hardware processor are contained within the housing;

wherein the housing comprises:

a first surface of the beverage container lid and a second surface of the beverage container lid;

the first surface or the second surface comprising a control interface;

a third surface opposite the first surface; and a fluid channel connecting the first surface to the third surface.

2. The apparatus of claim 1, wherein the control interface comprises a display screen.

3. The apparatus of claim 1, wherein the control interface comprises a power button, a volume control button, a Bluetooth synchronization button, or a phone control button.

4. The apparatus of claim 1, wherein the housing comprises an input/output (I/O) port.

5. The apparatus of claim 1, wherein the wireless transceiver comprises a Bluetooth transceiver.

6. The apparatus of claim 1, wherein the wireless transceiver is to link with one or more other beverage container lids and to synchronize audio output with the one or more other beverage container lids.

7. The apparatus of claim 1, further comprising a microphone to receive audible information; and the hardware processor to interpret the received audible information and convert the received audible information to electronic signals and to execute the electronic signals.

8. The apparatus of claim 1, wherein the processor is to convert electrical signals into audible voice signals and to cause the audio speaker to output the audible voice signals.

9. The apparatus of claim 1, the wireless transceiver to receive a wireless signal representative of a command input into the audio device; and the hardware processor to convert the wireless signal into a command and execute the command.

10. A beverage container lid comprising:

an audio speaker;

a wireless transceiver to transmit and receive wireless signals;

a hardware processor to process wireless signals received by the wireless transceiver and to output audible signals through the audio speaker;

a housing with a first surface and a second surface opposite the first surface; and a fluid channel connecting the first surface and the second surface;

wherein the audio speaker, the wireless transceiver, and the hardware processor are contained within the housing;

wherein the housing comprises a power control button, a volume control button, an audio playback control button, a phone control button, or a display screen.

11. The beverage container lid of claim 10, wherein the housing comprises an outer sidewall, the outer sidewall comprising an input/output (I/O) port.

12. The beverage container lid of claim 11, the outer sidewall comprising the power control button, the volume control button, the audio playback control button, the phone control button, or the display screen.

13. The beverage container lid of claim 10, wherein the the fluid channel has a drinking aperture on the first surface.

14. The beverage container lid of claim 13, wherein the first surface comprises the power control button, the volume control button, the audio playback control button, the phone control button, or the display screen.

15. A system comprising:

a beverage container lid comprising:

an audio speaker;

a wireless transceiver to transmit and receive wireless signals;

a hardware processor to process wireless signals received by the wireless transceiver and to output audible signals through the audio speaker; and a housing comprising:

a top surface;

a bottom surface opposite the top surface;

a sidewall surface between the top surface and the bottom surface; and a fluid channel connecting the top surface with the bottom surface;

wherein the audio speaker, the wireless transceiver, and the hardware processor are contained within the housing; and wherein the top surface or the sidewall surface comprises a control interface.

16. The system of claim 15, wherein the control interface comprises one or more of a power control button, a volume control button, an audio playback control button, a phone control button.

17. The system of claim 15, wherein the sidewall surface comprises an input/output (I/O) port.

18. The system of claim 15, further comprising a container, the beverage container lid to fit onto the container.

19. The system of claim 15, wherein the the fluid channel has a drinking aperture on the top surface.

20. The system of claim 19, further comprising a drinking aperture cover on the top surface.

* * * * *